US007012342B1

(12) United States Patent
Stamps et al.

(10) Patent No.: US 7,012,342 B1
(45) Date of Patent: Mar. 14, 2006

(54) LOW POWER, SCALABLE MULTICHANNEL HIGH VOLTAGE CONTROLLER

(75) Inventors: James Frederick Stamps, Livermore, CA (US); Robert Ward Crocker, Fremont, CA (US); Daniel Dadwa Yee, Dublin, CA (US); David Wright Dils, Fort Worth, TX (US)

(73) Assignee: Sandia National Laboratories, Livermore, CA (US)

( * ) Notice: Subject to any disclaimer, the term of this patent is extended or adjusted under 35 U.S.C. 154(b) by 167 days.

(21) Appl. No.: 10/454,179

(22) Filed: Jun. 3, 2003

(51) Int. Cl.
*H02J 1/00* (2006.01)

(52) U.S. Cl. .................... 307/29; 361/170; 361/173; 710/305; 702/286; 307/39; 204/602

(58) Field of Classification Search ................ 307/18, 307/24, 29, 38, 39, 64, 82, 86; 361/170, 361/173, 174; 710/305; 702/286; 204/602
See application file for complete search history.

(56) References Cited

U.S. PATENT DOCUMENTS 4,994,953 A * 2/1991 Haak ........................... 307/82
5,800,690 A    9/1998 Chow et al. ................. 204/451
6,219,623 B1 * 4/2001 Wills ............................ 307/45
6,754,835 B1 * 6/2004 Bandholz et al. ............. 307/64

* cited by examiner

*Primary Examiner*—Jessica Han
(74) *Attorney, Agent, or Firm*—Fleisler Meyer, LLP

(57) ABSTRACT

A low voltage control circuit is provided for individually controlling high voltage power provided over bus lines to a multitude of interconnected loads. An example of a load is a drive for capillary channels in a microfluidic system. Control is distributed from a central high voltage circuit, rather than using a number of large expensive central high voltage circuits to enable reducing circuit size and cost. Voltage is distributed to each individual load and controlled using a number of high voltage controller channel switches connected to high voltage bus lines. The channel switches each include complementary pull up and pull down photo isolator relays with photo isolator switching controlled from the central high voltage circuit to provide a desired bus line voltage. Switching of the photo isolator relays is further controlled in each channel switch using feedback from a resistor divider circuit to maintain the bus voltage swing within desired limits. Current sensing is provided using a switched resistive load in each channel switch, with switching of the resistive loads controlled from the central high voltage circuit.

16 Claims, 5 Drawing Sheets

LOW POWER, SCALABLE MULTICHANNEL HIGH VOLTAGE CONTROLLER

BACKGROUND

1. Technical Field

The present invention relates to a voltage controller system for providing stable high voltage bus line voltages using low voltage control signals while minimizing circuit cost and size. More particularly, the present invention relates to a voltage control system for providing a number of high voltages over bus lines to drive capillary channels in a microfluidic system.

2. Related Art

Microfluidic systems are used for the acquisition of chemical and biochemical information. A microfluidic system refers to a device having channels that are generally fabricated at the micron or submicron scale with channel dimensions on the order of 5–100 micrometers. Fabrication of such fluidic microcapillary devices is provided using photolithography and chemical etching processes applied to silicon or glass substrates, techniques typically used in the semiconductor electronics industry. Applications of microfluidic systems include capillary electrophoresis, liquid chromatography, flow injection analysis, and chemical reaction and synthesis.

One method to transport fluids in capillaries of a microfluidic system uses voltages applied across channels in the system to create electric fields, with electrokinetic forces serving to move fluid materials through the channels. Electrokinetic forces have the advantages of direct control, fast response and simplicity.

To control fluid flow in capillaries of a microfluidic system requires a precise voltage to be applied across a number of channels. Microfluidic systems typically use a network of channels in a substrate. The channels connect a number of fluid reservoirs in contact with high voltage electrodes. To move fluid materials through the network of channels, specific voltages are applied to the various electrodes provided in reservoirs at the end of channels.

Voltages applied to the electrodes in the device can be high, for example up to thousands of volts per centimeter. High voltage supplies typically required for each electrode are expensive and bulky. Thus the cost of a complex microfluidic system using electrokinetic forces for fluid movement may be prohibitive.

SUMMARY

In accordance with the present invention, a power distribution system is provided which may be used to provide voltages to loads, such as electrodes in a microfluidic system. In the system individually controlled channel switching circuits are provided to distribute power from a central high voltage supply circuit. The individual channel switching circuits, less complex than the central supply, distribute power to enable a reduction in cost and size from the use of multiple central high voltage supplies, typically making up a power distribution system.

In the system according to the present invention, voltage is distributed to each individual load (or electrode) and controlled using the channel switches connected to high voltage bus lines. The channel switches each include complementary pull up and pull down photo isolator relays with photo isolator relay switching controlled from the central high voltage supply to provide a desired bus line voltage. The ability of the photo isolator relays to switch current of varying amounts enables precise control of voltage on each bus line.

In addition to control from the central power supply, switching of the photo isolators is further controlled in each channel switch circuit using feedback from a resistor divider circuit to maintain the bus voltage swing within desired limits. The divider circuit lowers the read-out voltage of the channel node so that special high-voltage voltmeters are not required. The divider circuits are also designed to draw negligible currents from the channels thereby minimizing unwanted electrochemical effects, such as gas generation if the system is used to control a microfluidics system.

Further in accordance with the present invention, current sensing is provided using a switched resistive load in each channel switch, with switching of the resistive loads controlled from the central high voltage circuit. Such measurement of electrical current in each channel can be used to provide a direct measure of fluid flow through the channels of a microfluidic system.

Thus, in one embodiment the system of the present invention is used to provide voltages to control a plurality of interconnected capillary channels of a microfluidic system. The voltages are applied to a plurality of electrodes at different nodes of the capillary channels to create electric fields in the capillary channels to electrokinetically move fluids. The voltages applied are set by the central high voltage control circuit and applied through signals to the individual channel switch circuits. Programmable control using the central high voltage control circuit with current measurement feedback enables precise control of fluid movement through a plurality of interconnected capillary channels.

BRIEF DESCRIPTION OF THE DRAWINGS

Further details of the present invention are explained with the help of the attached drawings in which.

DETAILED DESCRIPTION

Figure 1:
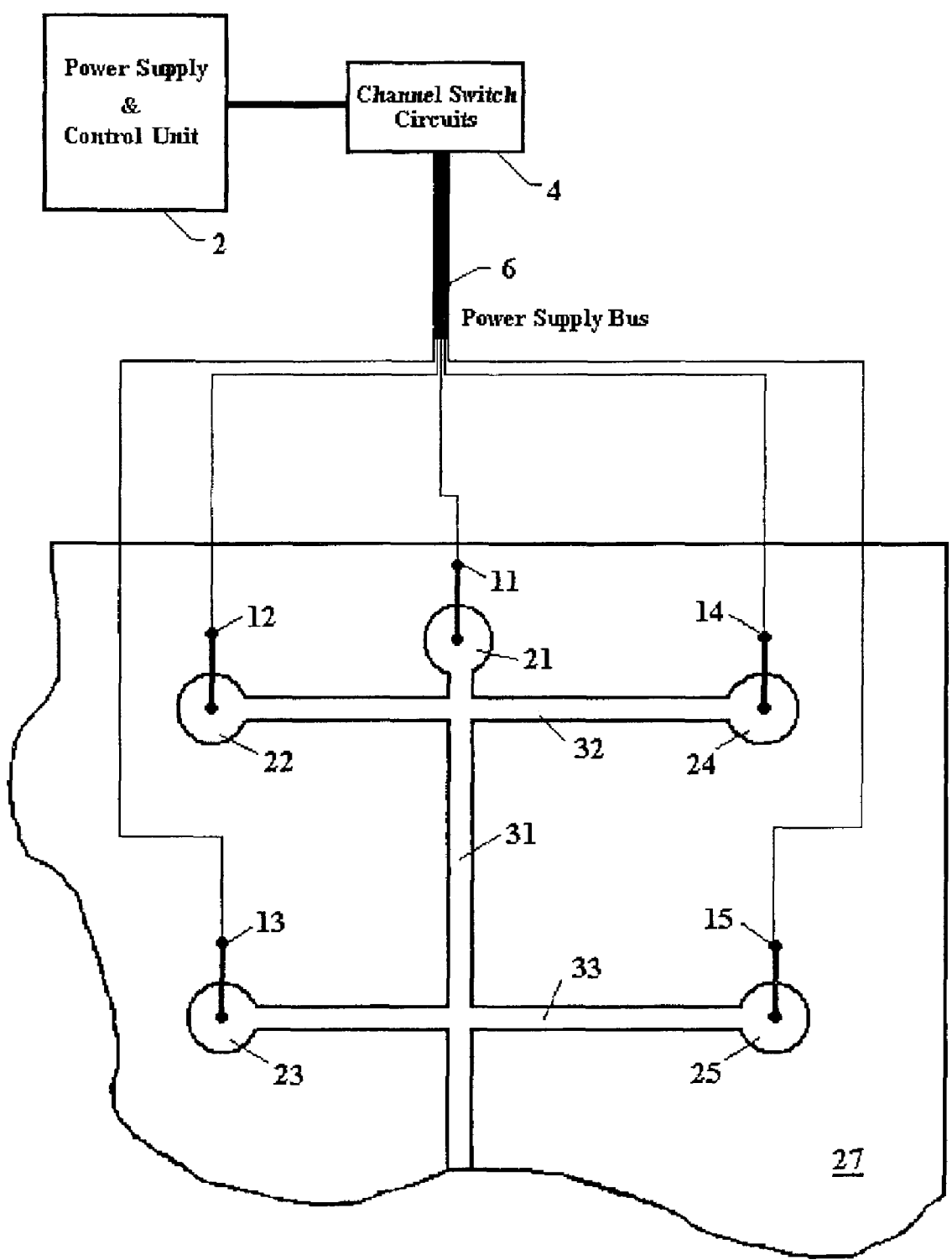
FIG. 1 shows a diagram of a portion of a microfluidic system with a power distribution system according to the present invention.

FIG. 1 shows a diagram of a portion of a microfluidic system with a power distribution system according to the present invention. The power distribution system includes a power supply & control unit 2 that supplies both power and control signals to a plurality of channel switching circuits 4. The channel switch circuits 4 distribute voltage signals over power supply bus lines 6 to individual electrodes 11–15 provided in reservoirs 21–25 of a microfluidics system.

The reservoirs 21–25 are fluidly connected at the ends of channels 31–33 to form the microfluidics system. The microfluidics reservoirs and channels are formed in a planar substrate 27. The microfluidic system transports fluids from reservoirs 21–25 through the various channels 21–23 of substrate 27. To move materials through the channels 21–23, the channel switching circuits 4 apply selectable voltage levels, including ground, to each of the reservoirs 21–25. Power is supplied to the channel switching circuits 4 along with control signals to set the bus line voltages from the power supply & control unit 2.

The channel switch circuits 4 include relays to apply high voltage signals over bus lines 6 to the electrodes 11–15, and voltage dividers for feedback control to maintain the voltages to a desired value. The channel switch circuits 4 further include current flow sensors connected to each electrode 11–15 to enable monitoring of fluid flow. Components of the channel switch circuits 4 are described in more detail with respect to FIGS. 2 and 3.

The power supply & control unit 2 provides the high voltages to the relays of the channel switching circuits 4, along with control signals to enable the voltage on each bus line to be precisely set. More details of the power supply and control unit 2 are described subsequently with respect to FIG. 6.

Figure 2:
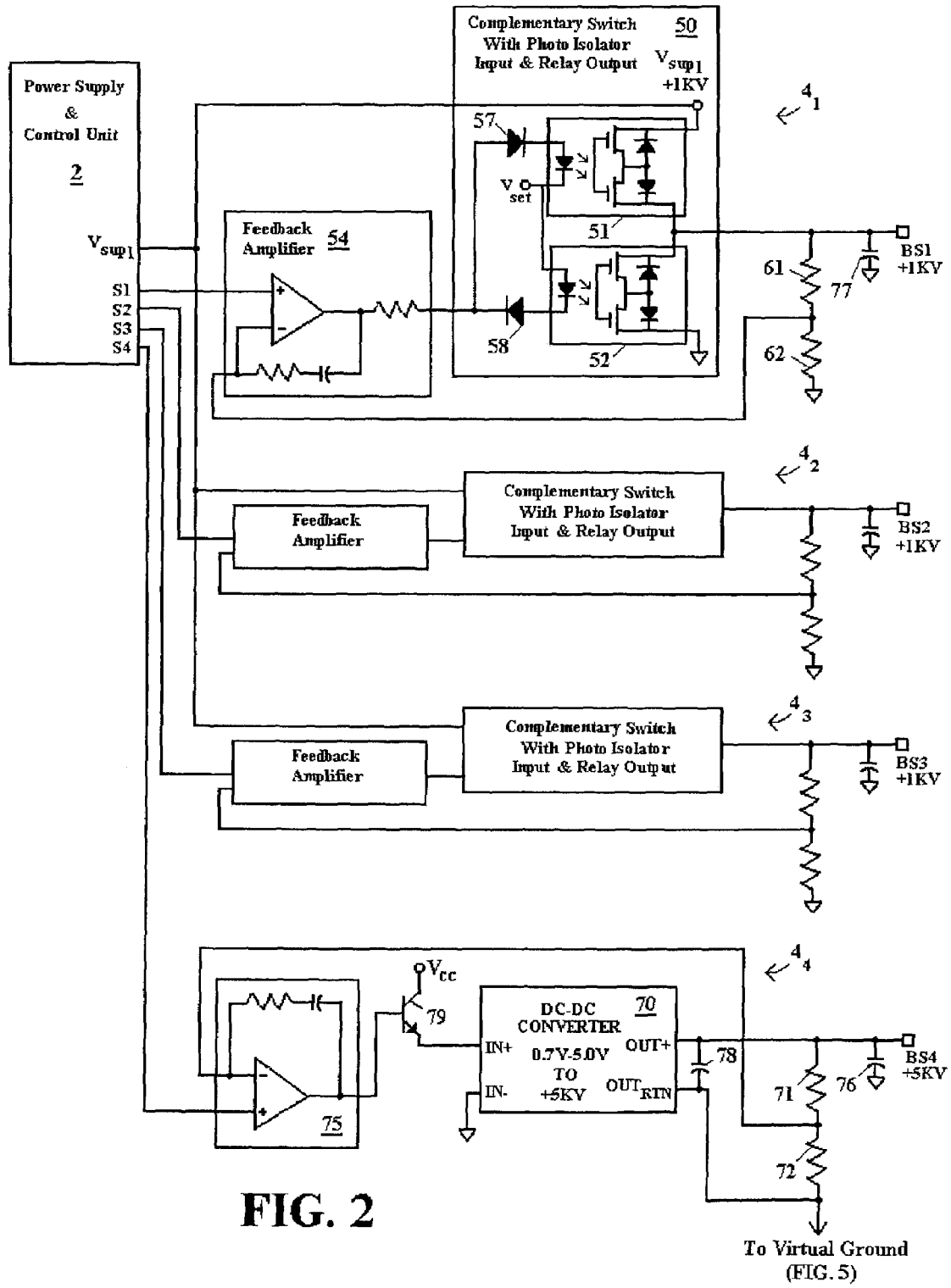
FIG. 2 shows details of the channel switching circuit of FIG. 1.

FIG. 2 shows details of the channel switch circuits 4 of FIG. 1, as connected to the power supply and control unit 2. The channel switch circuits 4 shown include circuits $4_1$–$4_4$. Each of the channel switch circuits $4_1$–$4_3$ has similar components, so details are described with respect to the channel switch circuit $4_1$. The channel switch circuit $4_1$ includes a complementary switch 50 with a pair of photo optical isolator relays 51 and 52. Each photo isolator has an isolated input operating at a low voltage in the range of 1–5V, and a relay output operating in the range of +1 KV. The photo isolator relays 51 and 52 are controlled by a signal from feedback amplifier 54. An example of the photo isolator relay is the AROMAT photoMOS solid-state relay AQV-258.

The photo isolators 51 and 52 operate as a complementary pair. In photo isolator 51, the relay output has a first terminal connected to a bus line BS1 supplying a channel, and a second terminal connected to a high voltage power supply connection Vsup1, providing on the order of 1000 volts to drive the bus line BS1 to a variable potential up to 1000 volts when sourcing current. Vsup1 is provided from the power supply & control unit 2. The relay output of photo isolator 52 has a first terminal connected to the bus line BS1 and a second terminal connected to ground to drive bus line BS1 to a variable potential down to ground when sinking current. A common input signal from the feedback amplifier 54 drives the photo isolators 51 and 52 to turn on and off to set the voltage on line BS1 to a desired level. One aspect of the present invention takes advantage of the fact that the photo isolators 51 and 52 turn on in varying degrees depending on the input signal, similar to a pair of complementary MOS transistors typically used to form a CMOS op-amp.

The photo isolator relays 51 and 52 provide a relay output switching power to a supply capacitor 77. The supply capacitor is sized to support a desired load level. Diodes 57 and 58 are connected to the inputs of the photo isolators 51 and 52 to turn on the photo isolators 51 and 52 in a complementary fashion as controlled by a single input signal from the feedback amplifier 54. A voltage Vset connected to a second input terminal of each of the photo isolators 51 and 52 is set to a desired threshold switching voltage. In one embodiment Vset is provided at 2.5V with 0–5V drive voltages provided to diodes 57 and 58. The voltage Vset can be supplied from the power supply & control unit 2.

With the voltage on the bus lines being very high (on the order of 1 KV) while control voltages are much lower (on the order of 5V), a voltmeter directly measuring the voltage on a bus line, such as BS1, must have a very high input impedance. Such voltmeters are expensive. To avoid costs of voltmeters, the bus line BS1 is connected to a voltage divider circuit formed by series resistors 61 and 62. The central terminal of the series resistors 61 and 62 provides a significant voltage reduction from the voltage on line BS1, and is carried as a feedback input to feedback amplifier 54. As shown for explanatory purposes, the voltage on BS1 is divided on the order of a 200-to-1 ratio to provide the feedback signal for amplifier 54. The feedback signal provides a control voltage to maintain the voltage BS1 at a desired level.

A second input of the feedback amplifier 54 is connected to a voltage reference S1 provided from the power supply and control unit. The signal S1 is an analog signal varying from 0–5V and is controlled to set the voltage on BS1 to a desired value. Separate control voltages S2–S4 are provided to individually control the bus lines BS2–BS4 for channel switch circuits $4_2$–$4_4$.

The arrangement of the photo isolator relays 51 and 52 in the channel switch circuits $4_1$–$4_3$ allows current sourcing or sinking at a constant voltage. Current sourcing or sinking while providing a constant voltage is essential for any power supply used for microfluidic systems.

The channel switch circuits $4_1$–$4_3$ provide one embodiment of a channel switch circuit that can supply voltages on the order of 1 KV. The channel switch circuit 44 provides a second embodiment for controlling a slightly higher output (shown here as 5 KV). The circuit 44 includes a conventional DC-DC converter circuit 70 for converting a low voltage input, such as 0.7–5.0V, to a high voltage output, shown as 5 KV. An example of such a DC-HVDC converter is the Q50-5 manufactured by EMCO Corporation of Sutter Creek, Calif. As with the circuits $4_1$–$4_3$, the circuit $4_4$ includes a voltage divider made up of a series pair of resistors 71 and 72 has a common terminal connected to provide a low voltage feedback signal to a feedback amplifier 75. A second terminal of resistor 72 is connected to an output return ($OUT_{RTN}$) of the DC-DC converter 70, as well as to a virtual ground. A virtual ground can be provided at the input of a differential amplifier, such as the amplifier 120 of FIG. 5 discussed subsequently. A second terminal of resistor 71 connects to the bus line output BS4, and is connected to the positive output (OUT+) of the DC-DC converter 70. A load capacitor 76 connects the bus line BS4 to ground.

The output terminals OUT+ and $OUT_{RTN}$ are connected by a capacitor 78. The capacitor 78 serves to reduce the high frequency noise radiated by the DC-DC converter 70. To reduce noise, it is further preferable to wrap or encase the DC-DC converter circuitry 70 in electrically ground material, for example copper tape. Without such steps to reduce noise, circuitry included nearby, such as the current sensing circuitry discussed subsequently in FIG. 4 will experience significant interference.

The feedback signal for the common terminal of resistors 71 and 72 is connected to the negative input of a feedback amplifier 75. A positive input of the amplifier is controlled by a signal S4 from the power supply & control unit 2. The output of the feedback amplifier 75 drives the base of transistor 79. Transistor 79 connects the supply voltage Vcc (approximately 5V for the DC-DC converter 70 shown) to the positive input IN+ of the DC-DC converter 70. The negative input IN– is connected to ground. The signal S4 is an analog signal with transitions controlled to set the output on bus line BS4 up to +5 KV, as shown. Feedback assures that the output BS4 remains at the desired 5 KV level.

Figure 3:
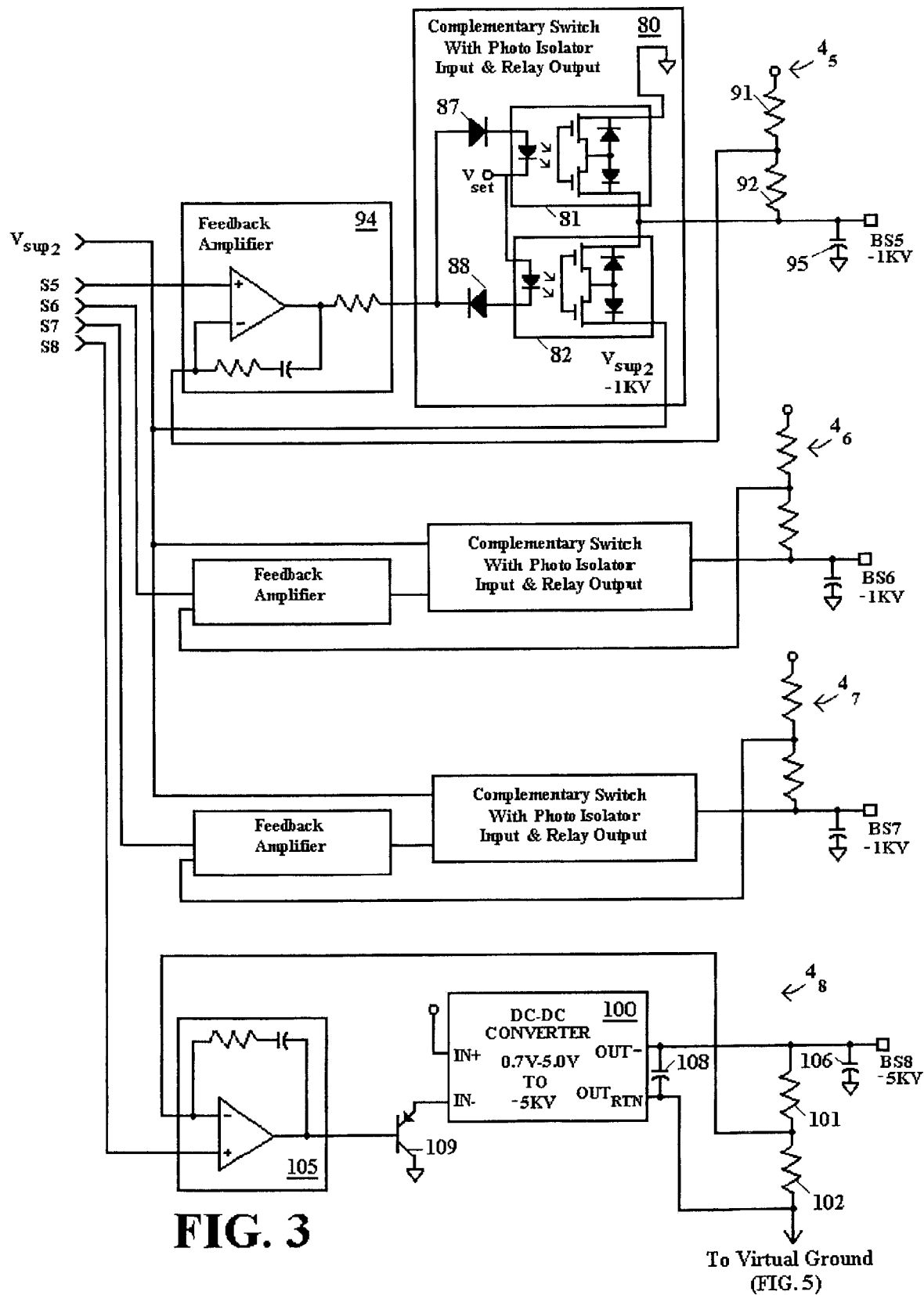
FIG. 3 shows additional channel switching circuits configured to provide negative bus line output voltages.

FIG. 3 shows additional channel switching circuits $4_5$–$4_8$ which provide negative bus line outputs BS5–BS8. As with the channel switching circuits $4_1$–$4_3$, the channel switching circuits $4_5$–$4_7$ include similar components, so components for circuits $4_5$–$4_7$ will be described with respect to circuit $4_5$. The channel switching circuit $4_5$ includes a complementary switching circuit 80 and feedback amplifier 94. The complementary switching circuit 80 includes complementary photo isolator relays 81 and 82 similar to relays 51 and 52 of FIG. 2. The photo isolator relays are driven by diodes 87 and 88 using a single output from the feedback amplifier 94, similar to diodes 57 and 58 and their connection to feedback amplifier 54 in FIG. 2. Second input terminals of photo isolator relays 81 and 82 are connected to a threshold voltage Vset. Unlike the complementary switch 50, the pull up photo isolator relay 81 connects the bus line BS5 to ground, while the pull down isolator relay 82 connects the bus line BS5 to a negative voltage Vsup2, shown as −1 KV. The high negative voltage Vsup2 is provided from the power supply and control unit 2.

Series resistors 91 and 92 provide feedback to the amplifier 94, similar to resistors 61 and 62 and their connection to feedback amplifier 54 of FIG. 2. However, unlike the series resistors 61 and 62 that connect bus line BS1 to ground, series resistors 91 and 92 connect the bus line BS5 to a voltage Vcc. In one embodiment, Vcc is set to approximately 5.0 volts. The common terminal of resistors 91 and 92 provides an inverting input to feedback amplifier 94, while the non-inverting input is an analog switching signal S5 provided by the power supply & control unit 2 to set the voltage on line BS5 to a desired level. Analog switching signals S5–S7 are likewise provided to circuits $4_5$–$4_7$ to set their outputs BS5–BS7 to desired levels. A capacitor 95 connected to the bus line is sized to drive the output.

The channel switching circuit $4_8$ is configured to drive a greater negative voltage, shown as −5 KV, than the circuits $4_5$–$4_7$, shown to drive −1 KV, and has components similar to the circuit $4_4$ of FIG. 2, shown driving +5 KV. The circuit includes a DC-DC converter 100 with series resistors 101 and 102 connecting its output terminals, similar to the DC-DC converter 70 and resistors 71–72 of FIG. 2. As with DC-DC converter 70, the output $OUT_{RTN}$ of the DC-DC converter 100 is connected to a virtual ground, which may be provided by an amplifier, as discussed subsequently with respect to FIG. 5. One of example of a circuit which may be used for the DC-DC converter 100 is the Q50N-5 manufactured by EMCO Corporation. A load capacitor 106 connects the negative output OUT− at bus line BS8 to ground. Unlike the DC-DC converter 70 of FIG. 2, the DC-DC converter 100 has a positive input connected to Vcc, and a negative input connected through an emitter to collector path of transistor 109 to ground. The base of transistor 109 is driven by the feedback amplifier 105. Like the capacitor 78 connecting the output terminals of DC-DC converter 70 in FIG. 2, a capacitor 108 connects the outputs of DC-DC converter 100 to reduce noise. Further, to reduce noise, the DC-DC converter 70 is wrapped in copper tape, or otherwise grounded.

The outputs BS1–BS8 are connected in one embodiment to electrodes in a microfluidics system to control movement of fluids. Signals S1–S8 are then set using a processor to control voltages on bus lines BS1–BS7 to control fluid movement in the microfluidics system. Although described with use in a microfluidics system, it is understood that the power supply system described with respect to FIGS. 2 and 3 can be used to supply high voltages to other systems.

In addition to providing controlled high voltage outputs on bus lines, in one embodiment measurement is provided of current drawn from the nodes BS1–BS7. For a microfluidics system, current flow at a given electrode is directly related to the rate of fluid flow along the channel(s) connecting the reservoir in which the electrode is placed. Voltages on the electrodes of the microfluidic system can be set in response to the electric currents flowing through the various electrodes to control fluid movement.

Figure 4:
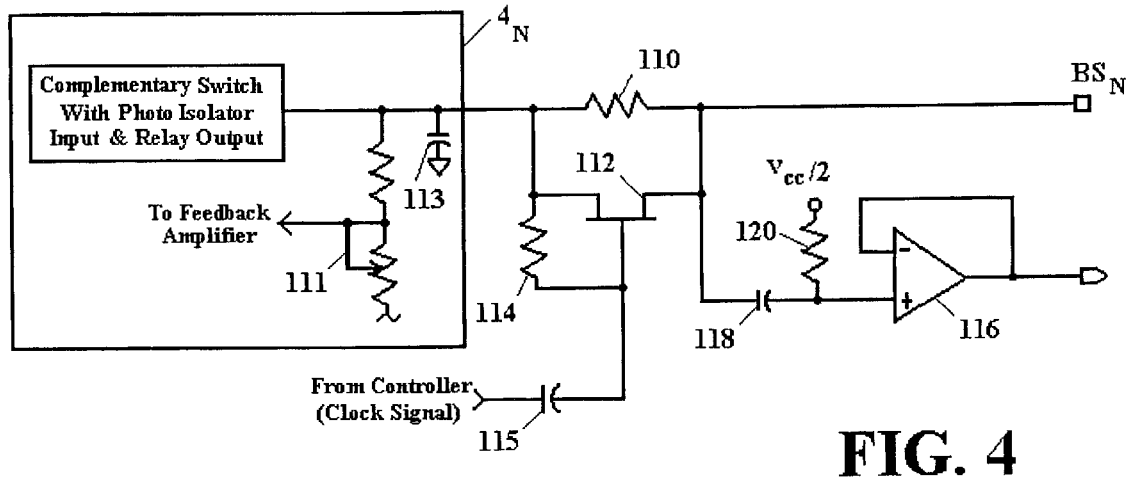
FIG. 4 shows components, which can be added to the channel switching circuits of FIG. 1 to measure current flow from their respective bus lines.

FIG. 4 shows components that can be added to the channel switch circuits, $4_1$–$4_3$ of FIG. 2 or $4_5$–$4_7$ of FIG. 3, labeled as $4_N$ in FIG. 4, to measure current flow from their respective bus lines BS1–BS3, or BS5–BS7, labeled as $BS_N$ in FIG. 4. For reference, a portion of the circuit components used in the channel switching circuits are carried over from circuits $4_1$–$4_3$ and $4_5$–$4_7$ to form channel switch circuit $4_N$ in FIG. 4. The current measurement circuit of FIG. 4 adds a resistor 110 in the path between the bus line output, labeled $BS_N$, and a load capacitor 113. A field effect transistor (FET) 112 then is placed with its source to drain path in parallel with the resistor 110. The source and gate of transistor 112 are connected by a large resistor 114 to reduce the effect of parasitic capacitance when a gate clock signal is applied. An isolating capacitor 115 is placed between the gate of transistor 112 and a clock input. The capacitor 115 AC couples a square wave clock signal to the transistor 112, while capacitor 118 AC couples out a resulting harmonic square wave created having an amplitude proportional to the measured current.

In operation, a clock signal is applied from the power supply and control unit 2 to turn transistor 112 on and off to provide either a direct (short circuit) path between the channel switch circuit $4_N$ and the output $BS_N$, or a path through resistor 110. The measured voltage difference between when the transistor 112 is on and off can then be used to determine current flow. Voltage is measured using a voltage follower amplifier 116 having its inverting input and output connected together, and its non-inverting input connected through an isolation capacitor 118 to the drain of transistor 112 at the output $BS_N$. The system voltage Vcc/2 is applied through a resistor 120 to bias the non-inverting input of amplifier 116.

Figure 5:
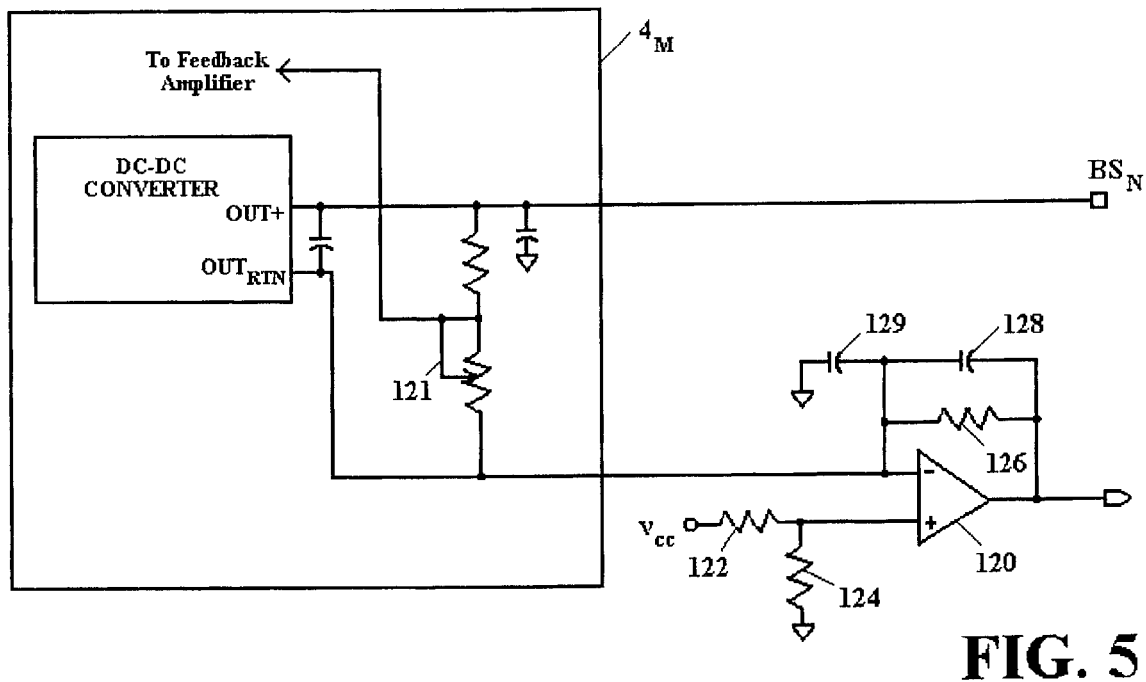
FIG. 5 shows a configuration of circuitry for measuring current flow when a higher output voltage is provided.

FIG. 5 shows current sensing circuitry to be added to the higher voltage channel switching circuits $4_4$ and $4_8$, shown in FIG. 5 as $4_M$. A portion of the channel switching circuitry components are carried over from circuits $4_4$ and $4_8$ in channel switching circuit $4_M$ of FIG. 5 for reference. The current measurement circuitry is provided from the output of a transimpedance amplifier 120 having an inverting (−) input connected to the return output $OUT_{RTN}$ of the DC-DC converter of circuit $4_M$, and a (+) non-inverting input connected to a voltage reference. The voltage reference is provided from the common terminal of series resistors 122 and 124, with a second terminal of resistor 122 connected to Vcc and a second terminal of resistor 124 connected to ground. A parallel resistor 126 and capacitor 128 are connected from the output of amplifier 120 to its inverting input, while a capacitor 129 connects the noninverting input of amplifier 120 to ground to provide an appropriate bias and feedback.

As part of the current monitoring circuit of FIG. 5 for the ±5 KV supplies, the bottom of the voltage divider circuit (formed by series resistors 71,72 or 101,102) connects to the inverting (−) input of a transimpedance amplifier 120 to form a virtual ground. To assure proper amplifier biasing while providing a virtual ground, the voltage Vcc applied to resistor 122 can be raised slightly above the system voltage with the raised system voltage applied as Vcc to the DC-DC converters. For example with the system voltage Vcc being 5.0 volts, 5.12 volts could be used as the raised system voltage. As such, the virtual ground of transimpedance amplifier 120 will be 0.12 V (for the +5 KV) version or 5.00 V (for the −5 KV version) exactly 0.12 V away from the 5.12 volt supply or ground.

In one embodiment of the present invention, to provide precise feedback control if tight tolerances are required for the outputs $BS_N$, one of the series feedback resistors is made a variable resistor. Such a variable resistor is illustrated as component 111 in FIG. 4, and component 121 of FIG. 5. The variable resistor can be a potentiometer, allowing interactive control by a user, or it can be set during manufacture by physically trimming the resistors.

Figure 6:
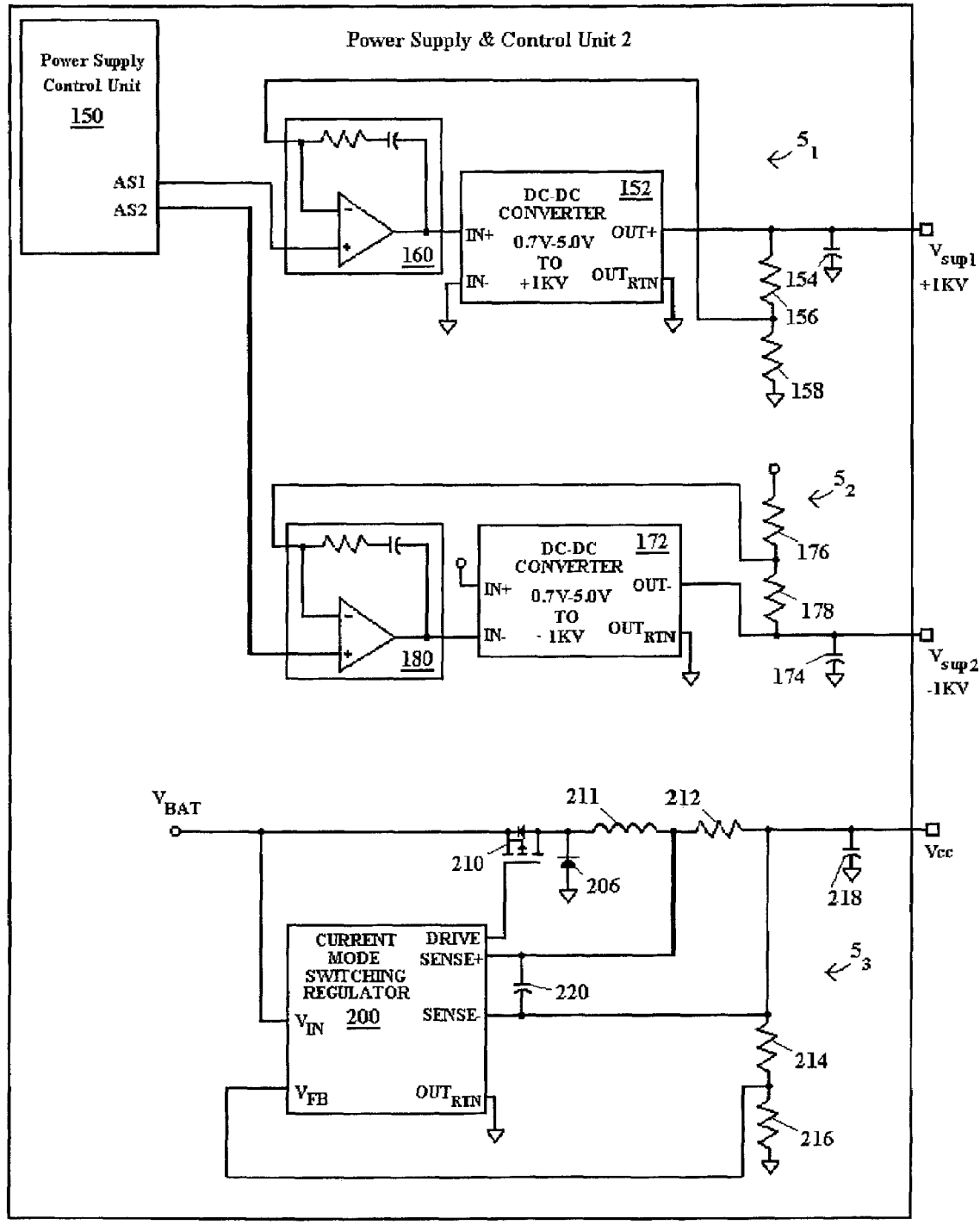
FIG. 6 shows details of the power supply & control circuit of FIG. 1.

FIG. 6 shows a portion of the components of the power supply & control unit 2 of FIG. 1 used to generate the reference voltages Vsup1, Vsup2 and Vcc. The power supply & control unit 2 includes the control unit 150 which generates control signals, such as S1–S4 of FIG. 1. The control unit 150 shown further provides internal control signals AS1 and AS2 used to set the voltage references Vsup1 and Vsup2 to desired values. The power supply portion of the power supply and control unit 2 includes a first power supply circuit 51 for generating the signal Vsup1, a second power supply circuit 52 for generating the signal Vsup2 and a third power supply circuit for generating Vcc.

The first power supply unit 51 includes a DC-DC converter 152 for converting a 0.7–5.0V input to a +1 KV output. A first output terminal OUT+ of the DC-DC converter 152 provides the +1 KV reference voltage Vsup1. A capacitor 154 supporting the intended load for Vsup1 is connected from the output OUT+ to ground, while series resistors 156 and 158 connect the output OUT+ to ground, and have a central terminal providing a feedback control signal. The feedback signal is provided to an inverting input of an amplifier 160. A non-inverting input of amplifier 160 receives the analog input control signal AS1. The output of feedback amplifier 160 is connected to a first input IN+ of the DC-DC converter 152. A second input IN− and return output $OUT_{RTN}$ of the DC-DC converter 152 are both connected to ground.

The second power supply unit 52 includes a DC-DC converter 172 for converting a 0.7–5.0V input to a −1 KV output. A first output terminal OUT− of the DC-DC converter 172 provides the −1 KV voltage reference Vsup2. A capacitor 174 supporting the intended load for Vsup1 is connected from the output OUT− to ground, while series resistors 176 and 178 connect the output OUT− to Vcc, and have a central terminal providing a feedback control signal. The feedback signal is provided to an inverting input of an amplifier 180. A non-inverting input of amplifier 180 receives the analog input control signal AS1. The output of feedback amplifier 180 is connected to a first input IN− of the DC-DC converter 172. A second input IN+ is connected to Vcc, while the return output $OUT_{RTN}$ of the DC-DC converter 152 is connected to ground.

The third power supply unit 53 provides a stable system voltage Vcc from a battery voltage $V_{BAT}$. The current at the output supplying Vcc is controlled using a current mode switching regulator 200. An example of the current mode switching regulator is the LTC1147-5 manufactured by Linear Technologies Corporation. The regulator 200 basically is a pulse width modulation (PWM) voltage regulator, mainly employing MOSFET 210, inductor 206, and free-wheeling diode 218 to chop and filter the input voltage to a lower regulated output voltage at high efficiency (>90%). A battery input voltage $V_{BAT}$ provides the control input $V_{IN}$ of the switching regulator 200 and the source voltage of FET 210. The drain voltage of FET 210 is then connected through an inductor 211 and resistor 212 to provide the circuit output Vcc. Sensing of current is provided by the current mode switching regulator 200 using SENSE+ and SENSE− connections across resistor 212. Current control is then provided from the DRIVE output of switching regulator 200 to the gate of transistor 210. Feedback for the current controller is provided using series resistors 214 and 216 connected from the output providing Vcc to ground, with the common terminal of resistors 214 and 216 connected to the feedback input $V_{FB}$ of the current mode switching regulator 200. A load capacitor 220 is connected across the sense inputs SENSE+ and SENSE− of the current controller 220.

Although the present invention has been described above with particularity, this was merely to teach one of ordinary skill in the art how to make and use the invention. Many additional modifications will fall within the scope of the invention, as that scope is defined by the claims that follow.

What is claimed is:

1. A power supply system comprising: power supply bus lines;
   a power supply unit for providing voltages to the power supply bus lines;
   a power supply control unit for providing control signals indicating desired voltages on the power supply bus lines;
   switching circuits connected to the bus lines, each switching circuit receiving the control signal from the power supply control unit and connecting one of the voltages from the power supply unit to a given one of the power supply bus lines to maintain one of the desired voltages on the given power supply bus line based on the control signal;
   wherein each of the switch circuits comprises a pair of photo isolator relays, wherein each photo isolator relay having a first photo isolator input terminal coupled for receiving a given one of the control signals from the power supply control unit, and a relay output having a first terminal connected to a given one of the power supply bus lines,
   wherein a first one of the photo isolator relays of each pair has a second output terminal connected to receive a given one of the voltages from the power supply unit; and
   wherein a second one of the photo isolator relays of each pair has a second input terminal connected to a first power supply potential.

2. The power supply system of claim 1, wherein the first voltage potential is a ground potential.

3. The power supply system of claim 1, wherein each of the switch circuits further comprises:
   a pair of series resistors comprising:
      a first resistor having a first terminal connected to the given bus lines, and a second terminal forming a feedback connection; and
      a second resistor having a first terminal connected to the first power supply potential, and a second terminal connected to the second terminal of the first resistor; and
      a feedback amplifier having a first terminal connected to receive the given control signal from the power supply control unit, and a second terminal coupled to the feedback connection of the pair of series resistors, and an output coupled to the inputs of the photo isolator relays.

4. The power supply system of claim 3, wherein each of the switch circuits further comprises:
   a first diode having an anode terminal connected to the output of the feedback amplifier, and a cathode terminal connected to the first photo isolator input terminal of a first photo isolator of the pair; and
   a second diode having a cathode terminal connected to the output of the feedback amplifier and an anode terminal connected to the first photo isolator input terminal of the second photo isolator of the pair,
   wherein second input terminals of the pair of photo isolators are connected to a second power supply potential.

5. The power supply system of claim 4, wherein each of the pairs of photo isolator relays maintains a constant voltage at a given one of the power supply bus lines, while a varied current is provided at the given power supply bus line.

6. The power supply system of claim 1, further comprising current sensors each connected to one of the bus lines, wherein each current sensor comprises:
   a current sense load resistor connecting the output of a given one of the switch circuits to a given bus line;
   a transistor having a source-drain path connected in parallel with the current sense load resistor, and having a gate coupled to receive a clock signal from the power supply control unit; and
   a voltage follower amplifier having an input coupled to the given bus line, and an output providing a current sense output.

7. The power supply system of claim 6, wherein the current sensor further comprises:
   a first isolation capacitor coupling the input of the voltage follower to the given bus line;
   a second isolation capacitor coupling the gate of the transistor to the clock signal input; and
   a resistor connecting a voltage potential to the input of the voltage follower amplifier.

8. The power supply system of claim 7, wherein the current sensor is a high voltage sensor, limited in voltage applied by the breakdown voltage of the first and second isolation capacitors.

9. The power supply system of claim 1, wherein the bus lines are connected to electrodes provided in reservoirs of a microfluidics system, wherein voltages on the bus lines are set to control fluid movement in channels connecting the reservoirs in the microfluidics system.

10. The power supply system claim 9, wherein each of the switch circuits further comprises:
    a pair of series resistors comprising:
       a first resistor having a first terminal connected to the given bus lines, and a second terminal forming a feedback connection; and
       a second resistor having a first terminal connected to the first power supply potential, and a second terminal connected to the second terminal of the first resistor; and
    a feedback amplifier having a first terminal connected to receive the given control signal from the power supply control unit, and a second terminal coupled to the feedback connection of the pair of series resistors, and an output coupled to the inputs of the photo isolator relays.

11. The power supply system of claim 10, wherein each of the switch circuits further comprises:
    a first diode having an anode terminal connected to the output of the feedback amplifier, and a cathode terminal connected to the first photo isolator input terminal of a first photo isolator of the pair; and
    a second diode having a cathode terminal connected to the output of the feedback amplifier and an anode terminal connected to the first photo isolator input terminal of the second photo isolator of the pair,
    wherein second input terminals of the pair of photo isolators are connected to a second power supply potential.

12. The power supply system of claim 11, wherein each of the pairs of photo isolator relays maintains a constant voltage at a given one of the power supply bus lines, while a varied current is provided at the given power supply bus line.

13. The power supply system of claim 9, further comprising current sensors each connected to one of the bus lines, wherein each current sensor comprises:
    a current sense load resistor connecting the output of a given one of the switch circuits to a given bus line;
    a transistor having a source-drain path connected in parallel with the current sense load resistor, and having a gate coupled to receive a clock signal from the power supply control unit; and
    a voltage follower amplifier having an input coupled to the given bus line, and an output providing a current sense output.

14. The power supply system of claim 13, wherein the current sensor further comprises:
    a first isolation capacitor coupling the input of the voltage follower to the given bus line;
    a second isolation capacitor coupling the gate of the transistor to the clock signal input; and
    a resistor connecting a voltage potential to the input of the voltage follower amplifier.

15. The power supply system of claim 14, wherein the current sensor is a high voltage sensor, limited in voltage applied by the breakdown voltage of the first and second isolation capacitors.

16. The power supply system of claim 9, wherein the first voltage potential is a ground potential.

* * * * *